June 16, 1964  F. B. WOOD  3,137,331
PECAN PEELER
Filed May 7, 1963
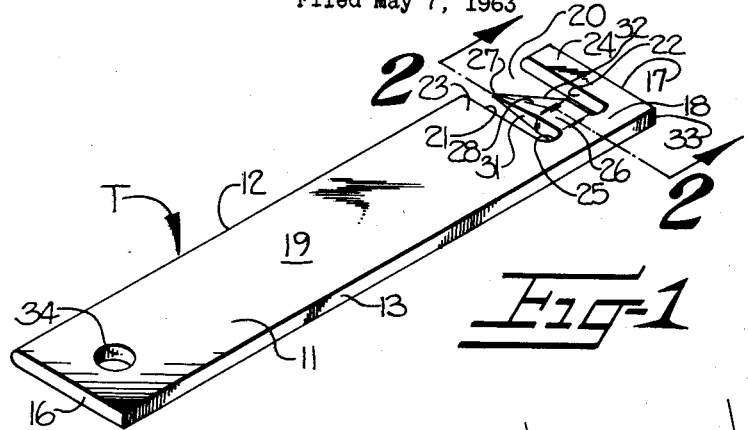
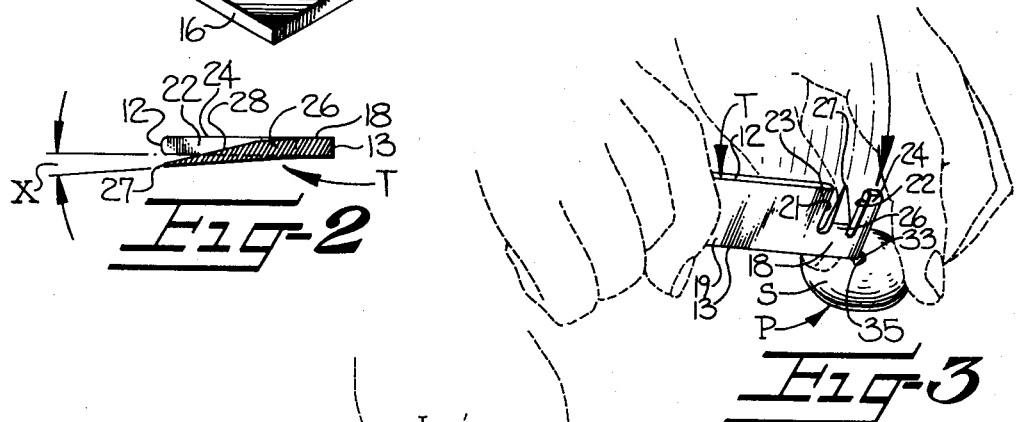
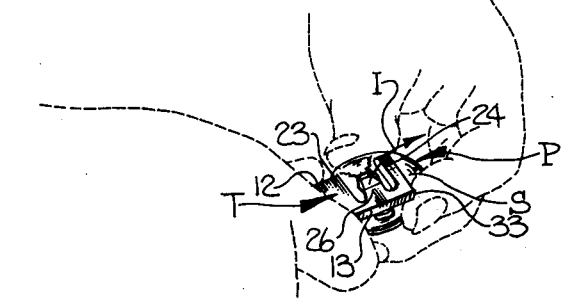
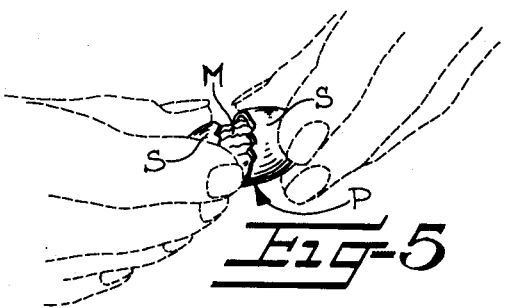
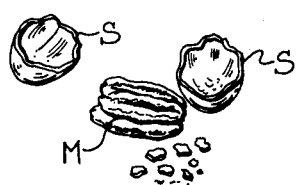
INVENTOR:
FRANK B. WOOD
BY  *P. Russell Foster*
ATTORNEY

United States Patent Office 3,137,331
Patented June 16, 1964

3,137,331
PECAN PEELER
Frank Butler Wood, 1786 Opal Ave., Stono Park,
Charleston, S.C.
Filed May 7, 1963, Ser. No. 279,041
6 Claims. (Cl. 146—13)

This invention relates to nut shellers and more particularly to a tool for removing the meat from nuts having relatively fragile shells such as pecans and the like.

The preference for whole meats over broken meats of nuts is widely shared particularly with nuts such as pecans and the like. Not only is there less waste when nuts are removed whole from the shell but the consumer's personal preference for whole nut meats such as pecans based on taste, decorative appeal and the like coupled with the difficulty of removing pecan nut meat whole has resulted in such whole nut meats commanding a considerable premium as opposed to broken nuts.

This preference for whole pecan nut meats has been long recognized and many devices, both commercial and domestic, for shelling pecans have been designed with this objective in mind. However, on the domestic scene, none of the present day tools for shelling pecans have proven satisfactory. While an occasional whole meat is obtained with such present day hand tools more often than not the meat is broken and, at best, the use of such present day tools is a tedious and time consuming operation. One source of difficulty with the use of present day hand tools is the initial requirement for cracking the shell prior to the use of such tools during which cracking the meat is generally also cracked making the removal of a whole meat virtually impossible.

In the commercial field where whole pecan nut meats are also desired due to the much higher price at which such whole meats can be sold, the problem of obtaining whole meats confronting the domestic sheller is further compounded in that the infinite variety of pecan configurations and the high rate at which such nuts must be shelled in a production line reduce the effectiveness of automatic machinery in obtaining whole nut meats which at best fall far below the desired performance for obtaining whole meats. Even a high degree of operator skill does not materially improve the performance of such automatic shelling machinery and the use of present day hand tools by skillful employees does not relieve the aforementioned problems in the domestic area. Thus with the lack of any suitable device for obtaining a high proportion of whole meats from shelled nuts, greatly enhanced profits which could be obtained have long gone unsecured due to the absence of any suitable commercial device for shelling such nuts.

Accordingly, a primary object of this invention is to provide a new and novel tool for removing the meat whole from nuts such as pecans and the like.

Another object of this invention is to provide a new and novel hand tool for removing the meat from nuts such as pecans in a whole and undamaged condition in a rapid and easy manner by hand.

A further object of this invention is to provide a new and novel one-piece hand tool for removing the meat whole from nuts such as pecans which may be inexpensively fabricated from flat metal stock so as to be of relatively low unit cost, which may be used to remove nut meat from the shell at a rapid rate not only for domestic use but for economic commercial production permitting the meat to be removed whole from virtually every shelled nut.

Still another object of this invention is to provide a new and novel method for removing the meat whole from nuts such as pecans and the like.

Other objects and advantages of the invention will become apparent from the following description taken in connection with the accompanying drawing.

In general, the objects of the invention and other related objects are accomplished by providing a tool comprising an elongated body member preferably formed in one piece from flat metal stock. The elongated body member includes a handle and a substantially flat head and the head is provided with a recess adjacent one end extending inwardly from one edge of the body member. A sharpened tooth having a pointed end and formed integrally with the head is positioned within the recess and is preferably angularly offset slightly from the plane of the head. In operation, the pointed tooth is inserted within an opening punched in the shell of a nut such as a pecan between the shell and meat with the portions of the head adjacent the recess in engagement with outer surface of the shell. The tool is then rotated to produce a rolling engagement between the head portions and the shell to pivot the tooth upwardly thereby separating the shell portion overlying the tooth from the shell. This operation is continued to remove a central band of shell circumferentially around the nut and the remaining shell end portions are removed leaving the whole meat.

The novel features which are believed to be characteristic of the invention are set forth with particularity in the appended claims. The invention itself, however, both as to its organization and method of operation may be best understood by reference to the following description taken in conjunction with the accompanying drawing in which:

FIGURE 1 is a perspective view of the tool of the invention;

FIGURE 2 is a sectional view taken substantially on line 2—2 of FIGURE 1;

FIGURE 3 is a perspective view illustrating the first step in the use of the invention;

FIGURE 4 is a perspective view of a subsequent step in the use of the invention;

FIGURE 5 is a perspective view illustrating the final step for removal of the meat from a nut after the use of the invention; and FIGURE 6 is a perspective view illustrating the whole meat and shell parts of a nut after the step of FIGURE 5.

Referring now to the drawing, there is shown a nut sheller constructed in accordance with the invention which is designated generally by the letter T. The nut sheller T is suitable for shelling or peeling any type of nut having a relatively fragile shell and is particularly adapted for removing the meat or kernel whole from a pecan. Although the invention is broadly applicable to any such nut, it is with reference to the shelling of a pecan that the invention will be described hereinafter.

Referring now to FIGURE 1, the tool T comprises an elongated body member 11 having side edges 12, 13 and end edges 16, 17. The body member 11 includes a substantially flat head 18 at one end and a handle 19.

As shown in the illustrated embodiment of FIGURE 1, the body member 11 is preferably formed from a single piece of substantially flat heavy metal such as iron, steel or the like and, therefore, the tool T is substantially flat throughout with the head 18 comprising an extension of the handle 19.

A recess 20 is formed within the tool head 18 extending inwardly from one edge of the body member 11. Preferably, as shown in FIGURE 1, the recess 20 is formed within the side edge 12 of the body member 11 and extends transversely of the body member throughout a substantial portion of its width. The recess 20 is preferably formed with substantially parallel side walls 21, 22 on adjacent head portions 23, 24 respectively and a bottom wall 25. A pointed tooth 26 formed integrally with the head 18 is positioned centrally within the recess 20 between the side walls 21, 22 and has a base coinciding with the recess bottom wall 25. The tooth 26 is provided with a tip or point 27 extending approximately to the body member side edge 12.

In order to provide a relatively sharp point 27, the tooth 26 is preferably beveled at 28 and is provided with converging side walls 31, 32 as shown. In order to facilitate the entrance of the point 27 of the tooth 26 under a nut shell, the tooth is offset slightly from the plane of the body member 11 as shown best in FIGURE 2 wherein the offset angle is indicated by the reference character X. It has been found that an offset of approximately 1/16 of an inch for the tooth 26 produces satisfactory results in the use of the tool T for shelling nuts such as pecans.

The tool T is also provided with at least one sharpened corner for a purpose to be explained hereinafter and, in the preferred embodiment, the head 18 of the tool T has a corner 33, preferably the corner opposite the tooth point 27, suitably sharpened such as by machining or otherwise grinding the surfaces of the body member edges 13, 17. The tool may also be provided with an opening 34 extending through the handle 19 adjacent the end opposite the head 18 to enable the tool to be hung when not in use from a suitable support such as a nail or the like.

In the use of the tool T of the invention to remove the meat or kernel whole from a nut, the nut such as a pecan P is held on a suitably hard surface by an operator with one hand as shown in FIGURE 3. The handle 19 of the tool T is grasped in the other hand and with a rapid downward stroke, the pecan P is struck centrally of the shell S by the sharpened corner 33. This action pecks a small hole 35 in the pecan shell S as shown in FIGURE 3.

The pecan P is then grasped as shown in FIGURE 4 and the pointed tooth 26 inserted through the shell opening 35 between the shell S and meat M with the head portions 23, 24 in engagement with the outer surface of the shell S. The offsetting of the tooth 26 from the plane of the tool T as shown in FIGURE 2 facilitates the insertion of the tooth 26 under the shell S while the head portions 23, 24 are maintained in engagement with the outer surface of the shell.

The tool T is then rotated in the clockwise direction as viewed in FIGURE 4 and as indicated by the arrow I so that the rolling engagement between the head portions 23, 24 and the outer surface of the shell S pivots the tooth 26 upwardly snapping off and separating the portion of the shell S overlying the tooth between the head portions 23, 24.

This shell portion removal operation is repeated a number of times around the central portion of the nut until a central band of shell extending completely around the nut is removed leaving portions of the shell S at each end of the nut. These shell end portions can then be removed as shown in FIGURE 5 from the meat M so that the meat and kernel is removed completely intact as shown in FIGURE 6.

It can be seen with the novel construction of the invention that there has been provided a hand tool for removing the shell from a nut such as a pecan to obtain the nut meat in a whole and undamaged condition. The tool of the invention while being extremely simple in construction and very inexpensive to manufacture may be manipulated in a rapid and easy manner so that the nut meat is not only obtained whole but in a far shorter period of time than possible with present day hand nut shellers. Furthermore, the punching of an opening in the shell rather than the cracking the shell by means of the tool eliminates the damage to the meat generally caused by tools which require initial cracking of the shell. The rapid shelling of nuts as permitted by the tool of the invention is not only suitable for domestic use but renders the tool attractive for commercial use wherein the combination of relatively rapid hand shelling and undamaged nut meats with the use of the tool regardless of the lower production rate permits enhanced profits due to the premium commanded by whole nut meats. The tool of the invention may be readily fabricated with a minimum of operations from readily available inexpensive flat metal stock so as to make it highly suitable for mass merchandising but at the same time is a tool which embodies a shelling principle so that the operation of the tool can be quickly and easily mastered without risk of injury to the hands.

While there has been described what at present is considered to be the preferred embodiment of the invention, it will be understood by those skilled in the art that various changes and modifications may be made therein without departing from the invention, and therefore, it is the aim of the appended claims to cover all such changes and modifications as fall within the true spirit and scope of the invention.

Having thus described the invention, what is claimed is:

1. A tool for removing the shell from a nut such as a pecan or the like comprising, in combination, an elongated body member including a handle and a substantially flat head extending from one end of said body member to at least said handle, said head having a recess adjacent said one end extending inwardly from one edge of said body member, a tooth having a pointed end formed integrally with said head positioned in said recess, said pointed tooth arranged to be inserted through a shell opening between the shell and meat of said nut with portions of said head adjacent said recess in engagement with the outer surface of said shell whereby rolling engagement between said head portions and said shell outer surface pivots said tooth upwardly to separate a shell portion overlying said tooth from said shell.

2. A tool for removing the shell from a nut such as a pecan or the like comprising, in combination, an elongated body member including a handle and a substantially flat head extending from one end of said body member to at least said handle, said head having a recess adjacent said one end extending inwardly from one edge of said body member and having a pair of substantially parallel side walls, a tooth having a pointed end formed integrally with said head positioned centrally in said recess between said side walls, said pointed tooth arranged to be inserted through a shell opening between the shell and meat of said nut with portions of said head adjacent said recess side walls in engagement with the outer surface of said shell whereby rolling engagement between said head portions and said shell outer surface pivots said tooth upwardly to separate a shell portion overlying said tooth from said shell.

3. A tool for removing the shell from a nut such as a pecan or the like comprising, in combination, an elongated one-piece, substantially flat body member including a handle extending from one end and a head extending from the other end, said head having a recess adjacent said other end extending transversely inward from one side edge of said body member and having a pair of substantially parallel side walls, a tooth having a pointed end formed integrally with said head positioned centrally in said recess between said side walls, said tooth extending approximately to said body member side edge, said pointed tooth arranged to be inserted through a shell opening between the shell and meat of said nut with portions of said head adjacent said recess side walls in engagement with the outer surface of said shell whereby rolling engagement between said head portions and said shell outer surface pivots said tooth upwardly to separate a shell portion overlying said tooth from said shell.

4. A tool in accordance with claim 3 wherein said tooth is angularly offset slightly from the plane of said head.

5. A tool in accordance with claim 4 wherein the angular offset of said tooth is approximately 1/16".

6. A tool for removing the shell from a nut such as a pecan or the like comprising, in combination, an elongated, one-piece body member of flat metal stock, said body member including a handle extending from one end and a head extending from the other end, said head having a sharpened corner for punching an opening in said shell, said head having a recess adjacent said other end extending transversely inward from one side edge of said body member and having a pair of substantially parallel side walls, a sharpened tooth of triangular shape and having a pointed end formed integrally with said head positioned centrally in said recess between said side walls, said tooth extending laterally outward to approximately said body member side edge and being angularly offset slightly from the plane of said body member, said pointed tooth arranged to be inserted through a shell opening between the shell and meat of said nut with portions of said head adjacent said recess side walls in engagement with the outer surface of said shell whereby rolling engagement between said head portions and said shell outer surface pivots said tooth upwardly to separate a shell portion overlying said tooth from said shell.

References Cited in the file of this patent

UNITED STATES PATENTS

| | | |
|---|---|---|
| 1,720,575 | Smith | July 9, 1929 |
| 2,179,758 | Schlueter | Nov. 14, 1939 |
| 2,201,911 | Mizera | May 21, 1940 |
| 2,461,524 | Cook | Feb. 15, 1949 |
| 2,596,382 | Duke | May 13, 1952 |
| 2,651,342 | Harless | Sept. 8, 1953 |
| 2,771,927 | Thaning | Nov. 27, 1956 |
| 2,806,501 | Van Dijk | Sept. 17, 1957 |